UNITED STATES PATENT OFFICE.

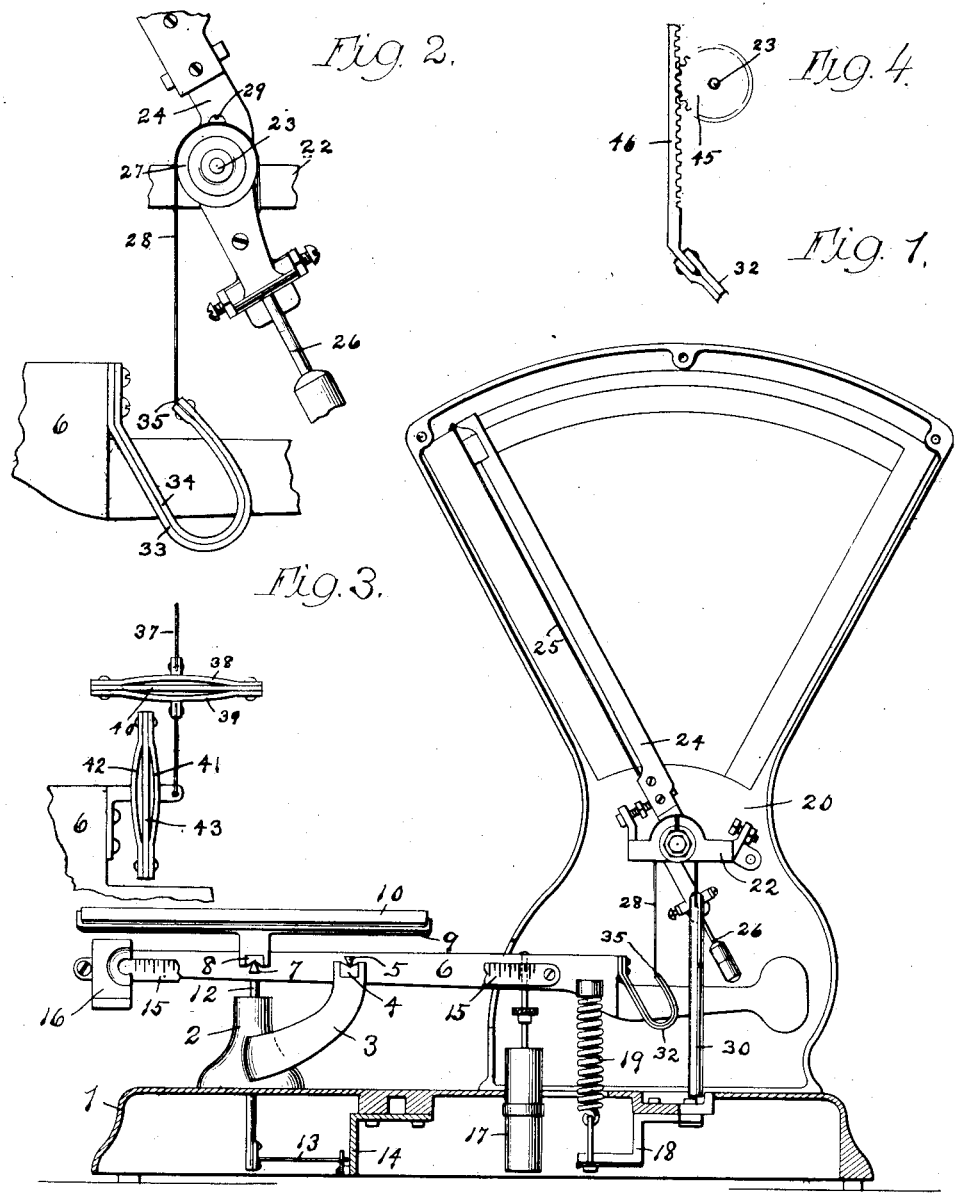

LOUIS JAENICHEN, OF DETROIT, MICHIGAN, ASSIGNOR TO THE STANDARD COMPUTING SCALE COMPANY, OF DETROIT, MICHIGAN, A CORPORATION OF MICHIGAN.

SCALE.

1,195,474.   Specification of Letters Patent.   Patented Aug. 22, 1916.

Application filed July 19, 1915. Serial No. 40,548.

*To all whom it may concern:*

Be it known that I, LOUIS JAENICHEN, a citizen of the United States, residing at Detroit, in the county of Wayne and State of Michigan, have invented a new and useful Scale, of which the following is a specification.

This invention relates to spring-scales provided with fan-shaped dials properly graduated and printed to represent the weight and value of the article on the load receiving pan or platform, in which scales an arm or pointer swings across the dial under the force exerted on a lever by the load, which force is resisted by a spring; and the object of this invention is to provide a scale of this type with means whereby the pointer will always be caused to indicate the correct amounts at all temperatures.

This invention consists, in combination with a base and a main load receiving lever mounted thereon, a spring to resist the movement of the lever, a pivoted arm to indicate movements of the lever, a thin metal tape connecting to said arm, and a thermostatic device, preferably of horseshoe form, connected to said lever and to said tape in such a manner that changes of temperature will not only vary the effective length of the lever arm to which it is connected, but will also vary the initial relation of the pointer and lever so that the pointer will approximate zero so long as there is no load on the pan or platform.

In the accompanying drawing, Figure 1 is a view in elevation of the upper part of a scale with the back of the housing removed and in longitudinal vertical section of the base. Fig. 2 is an elevation on a larger scale of a thermostatic device connected to the main lever and to the tape that controls the indicator. Fig. 3 is an elevation of a modified form of thermostatic device. Fig. 4 is an elevation of a modified form of connection between the thermostat and the indicator.

Similar reference characters refer to like parts throughout the several views.

In the present construction, which is similar in many respects to the construction shown in my former application No. 24627, filed April 29, 1915, the base 1, pedestal 2 having arms 3 to support the bearings 4 of the knife edges 5, the lever 6 having knife edges 7 on which rest the bearings 8 of the spider 9 for the plate, platform or pan 10, the check-rod 12, the check-link 13, the bracket 14 to which the link 13 connects, the tare-beam 15 and its poise 16, the dash-pot 17, the bracket 18, the spring 19, and the housing 20 may be of any desired construction and form no part of the present invention.

Secured to the housing 20 is a pair of brackets 22 which carry the bearings for the pivot 23 of the indicating arm or pointer 24, preferably provided with an indicating thread or wire 25. A counterbalancing arm 26 extends oppositely to the pointer and a hub 27 may also be connected to this pointer. A thin metal tape 28 may be secured to this hub by means of the screw 29, a counter weight 30 on one end of the tape serving to swing the pointer when permitted to do so by the rising of the adjacent end of the lever 6. Instead of directly connecting this metal tape 28 to the main lever, this invention interposes a thermostat between them, which is preferably set at such an angle that it will have peculiar values. This thermostat 32 is preferably horse-shoe shaped with the two arms extending at such an angle that when the arms move toward each other, the effective length of the lever arm is decreased and at the same time the pointer 25 is swung back toward the zero mark. By using a metal strip 33 of greater coefficient of expansion on the outside and a strip 34 of lesser coefficient on the inside, the effective distance from the pivot 5 to the end 35 of the thermostat will decrease with increasing temperature. That is, as the spring 19 becomes weaker because of the increase in temperature and therefore expands greater distances for the same increase in load, this thermostat will decrease the lever arm that actuates the tape 28 which will therefore be moved less distances for equal angular movements of the lever 6. At the same time the initial expansion of the spring because of increasing temperature will permit the adjacent arm of the lever to rise, but the same increase in temperature will cause the end 35 of the thermostat to swing down, thus counterbalancing its upward movement because of the expansion of the spring.

While this device has been shown connected to a simple lever, it will be apparent that it may be used on levers of any type or system. It will also be apparent that the construction and location of the thermostatic device may be changed. The construction shown in Fig. 3 consists of two thermostats, the upper one consisting of the slightly curved cross-bars 38 and 39, preferably of steel, and the cross-bar 40 of brass between them, with their adjacent ends rigidly secured together. This thermostat will take care of the initial expansion of the spring and cause the indicator to remain at zero when the scale is unloaded. The upper cross-bar connects to the tape 37, while the lower cross-bar 39 connects to the curved bar 41 of the second thermostat, which is also built up in the same manner as the first, the bars 41 and 42 preferably being of steel and the bar 43 of brass. As the spring becomes weaker with increasing temperature, the effective length of the arm of the lever to which the band 37 is connected also decreases, so that the effect on the weight indicator of equal increments of load remains the same.

Instead of a flexible connector 28 passing around the hub 27 of the indicator, a pinion 45 may be secured to the pivot 23, and a rack bar 46 connected to the thermostat 32 and held in engagement with the pinion. In this case as in all others, the parts must be proportioned so that the reduction of movement of the indicator will be in proper relation to the increased rate of expansion of the spring.

I claim:—

1. In a scale, the combination of a base and a pedestal thereon, a scale lever mounted on the pedestal, a load receiver connected to one arm of the lever, a load-resisting spring connected to the other arm of the lever, a pivoted weight indicator mounted adjacent the spring, a hub connected to the indicator, a flexible band secured intermediate its ends to said hub, a counterweight secured to one end of the band, and a thermostat connecting the opposite end of the band to the lever.

2. In a scale, the combination of a base and a pedestal thereon, a scale lever pivoted intermediate its ends on the pedestal, a load receiver connected to one arm of the lever, a load-resisting spring connected to the other arm of the lever, a pivoted weight indicator mounted adjacent the arm of the lever to which the spring connects, a circular hub connected to the pointer, a flexible band secured intermediate its ends to said hub, a counterweight secured to one end of the band, and a thermostat connected to said band and to the adjacent end of the lever, said thermostat being formed of two metal strips bent to horse-shoe form.

3. In a scale, the combination of a scale lever and a support therefor, a load receiver and a load-resisting spring connected to the lever, a weight indicator adjacent to one arm of the lever, a flexible band to control the operation of the weight indicator, and a horse-shoe shaped thermostat connecting the band and lever and having its arms at an angle to the lines of the lever and of the band.

4. In a scale, the combination of a scale lever and a support therefor, a load receiver and a load-resisting spring connected to the lever, a weight indicator adjacent one arm of the lever, a horse-shoe shaped thermostat mounted on said arm of the lever, and a connector between the thermostat and the weight indicator, said thermostat being so mounted that the end of the connector will be moved diagonally to the line of the lever with changes in temperature.

5. In a scale, the combination of a scale lever and a support therefor, a weight indicator, a horse-shoe shaped thermostat having one arm so connected to said lever that the other arm will move diagonally to the line of the lever with changes of temperature, and means connecting said other arm to the weight indicator.

6. In a scale, the combination of a scale lever, a support therefor, a load receiver and a load-resisting spring connected to the lever, a pivoted weight indicator, a flexible band to control the operation of the weight indicator, and a thermostat so connected to the flexible band as to reduce the distance between the pivoted indicator and the lever in proportion to the relative expansion of the spring due to a rise in temperature.

7. In a scale, the combination of a scale lever and a support therefor, a load receiver and a load-resisting spring connected to the lever, a weight indicator, a thermostatic device mounted on said lever, and a connector between the thermostatic device and the weight indicator, said thermostatic device being so mounted that the end of the connector will be moved diagonally to the line of the lever with changes in temperature.

8. In a scale, the combination of a scale lever and a support therefor, a weight indicator, an operating member connected to said indicator, and a thermostat connecting said operating member to the scale lever.

9. In a scale, the combination of a scale lever and a support therefor, a weight indicator, a thermostat rigidly connected to one arm of said lever, and weight indicator actuating means connecting directly to the thermostat.

10. In a scale, the combination of a scale lever and a support therefor, a weight indicator, a thermostat rigidly connected to one end of said lever, indicator operating means connecting directly to said thermostat, and means for resisting the action of the load upon said lever.

In testimony whereof I sign this specification.

LOUIS JAENICHEN.